(12) United States Patent
Heiskanen (10) Patent No.: US 9,837,765 B2
(45) Date of Patent: Dec. 5, 2017

(54) APPARATUS FOR EJECTING AT LEAST ONE INTEGRATED CIRCUIT CARD

(71) Applicant: Microsoft Technology Licensing, LLC, Redmond, WA (US)

(72) Inventor: Juuso Heiskanen, Kaarina (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/750,028

(22) Filed: Jun. 25, 2015

(65) Prior Publication Data
US 2016/0380385 A1   Dec. 29, 2016

(51) Int. Cl.
H01R 13/633   (2006.01)
G06K 7/00   (2006.01)
G06K 13/08   (2006.01)

(52) U.S. Cl.
CPC ....... H01R 13/6335 (2013.01); G06K 7/0021 (2013.01); G06K 7/0069 (2013.01); G06K 13/08 (2013.01); G06K 13/0806 (2013.01); G06K 13/0831 (2013.01)

(58) Field of Classification Search
CPC . H01R 13/625; H01R 13/635; H01R 13/6335
USPC ......................... 439/159, 160, 188
See application file for complete search history.

(56) References Cited

U.S. PATENT DOCUMENTS

| | | | |
|---|---|---|---|
| 6,039,587 A | 3/2000 | Oguchi | |
| 6,577,507 B2* | 6/2003 | Yamaguchi | H05K 7/1407 361/754 |
| 6,843,670 B2 | 1/2005 | Yamaguchi et al. | |
| 7,207,814 B2 | 4/2007 | Chen et al. | |
| 7,258,278 B2* | 8/2007 | Laitinen | G06K 13/08 235/451 |
| 7,510,415 B2 | 3/2009 | Wang | |

(Continued)

FOREIGN PATENT DOCUMENTS

| | | |
|---|---|---|
| CN | 101944670 A | 1/2011 |
| DE | 3916783 A1 | 4/1990 |

OTHER PUBLICATIONS

Purcher, Jack, "Apple Invents Secure Touchscreen SIM Card Tray Ejection System", Published on: Apr. 3, 2014 Available at: http://www.patentlyapple.com/patently-apple/2014/04/apple-invents-secure-touchscreen-sim-card-tray-ejection-system.html.

(Continued)

*Primary Examiner* — Tulsidas C Patel
*Assistant Examiner* — Marcus Harcum (57) ABSTRACT

An apparatus is described. In an embodiment, the apparatus comprises a housing; a tray; an ejector; a push member having two positions, the push member is configured to receive an external force for moving the push member and to operate the ejector to eject the tray to an ejected open position when the push member is moved to a second position and to maintain in the second position; and a switch comprising two electric position; the switch is configured to switch to a first electric position when receiving the external force, and the push member is configured to maintain the switch in the first electric position when the push member is moved to the second position causing the tray to eject; when the tray is returned to a retracted closed position, the push member is moved to a first position causing the switch to switch to a second electric position.

20 Claims, 10 Drawing Sheets

(56) References Cited

U.S. PATENT DOCUMENTS

| | | |
|---|---|---|
| 7,766,678 B1 | 8/2010 | Abe |
| 8,337,223 B2 | 12/2012 | Gao et al. |
| 8,777,669 B2 | 7/2014 | Hu et al. |
| 2004/0009690 A1* | 1/2004 | Natori ................. G06K 13/0806 439/152 |
| 2004/0140359 A1 | 7/2004 | Learmonth et al. |
| 2006/0226223 A1 | 10/2006 | Yu et al. |
| 2009/0149047 A1* | 6/2009 | Yu ......................... G06K 7/0047 439/135 |
| 2010/0159724 A1 | 6/2010 | Ida et al. |
| 2011/0136360 A1 | 6/2011 | Zhu et al. |
| 2014/0049920 A1 | 2/2014 | Sloey et al. |
| 2014/0101466 A1 | 4/2014 | Itakura |
| 2014/0273564 A1 | 9/2014 | Matsumoto et al. |
| 2014/0315404 A1* | 10/2014 | Wang ..................... G06K 13/08 439/159 |
| 2015/0018041 A1 | 1/2015 | Gorilovsky et al. |
| 2015/0022981 A1 | 1/2015 | Tan et al. |

OTHER PUBLICATIONS

International Search Report and Written Opinion Issued in PCT Application No. PCT/US2016/037308, dated Sep. 16, 2016, 14 Pages.

"Second Written Opinion Issued in PCT Application No. PCT/US2016/037308", dated May 17, 2017, 4 Pages.

"International Preliminary Report on Patentability Issued in PCT Application No. PCT/US2016/037308", dated Sep. 4, 2017, 8 Pages.

\* cited by examiner

APPARATUS FOR EJECTING AT LEAST ONE INTEGRATED CIRCUIT CARD

BACKGROUND

Many pieces of the existing electronic equipment that people use for communication and computation may have a slot for an integrated circuit card which is often called a smart card.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In an embodiment, an apparatus comprises a housing; a tray connected to the housing in a movable manner, the tray having a retracted closed position and an ejected open position with respect to the housing; an ejector configured to eject the tray to the ejected open position; a push member having a first position and a second position, wherein the push member is in the first position when the tray is in the retracted closed position, the push member is configured to receive an external force for moving the push member into the second position and to operate the ejector to eject the tray to the ejected open position in response to the push member being moved to the second position, and the push member is further configured to stay in the second position and maintain the second position even when the external force is removed. Further, the apparatus comprises a switch comprising a first electric position and a second electric position; wherein the switch is configured to receive the external force and to switch to the first electric position in response to receiving the external force, and the push member is configured to maintain the switch in the first electric position in response to the push member being moved to the second position and to cause the ejection of the tray to the ejected open position; and wherein, in response to the tray being returned back to the retracted closed position, the push member is moved back to the first position causing the switch to switch to the second electric position.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present embodiments and is not intended to represent the only forms in which the present apparatus may be constructed or utilized. However, the same or equivalent functions and sequences may be accomplished by different embodiments or a combination thereof.

Mobile wireless devices, such as mobile phones, laptops, tablets, smart watches and other smart wearables or cars with an on-board navigational system may need an integrated circuit card. It is also possible to use an external smart card reader for reading an integrated circuit card.

Often an integrated circuit card or a smart card may be any of a Subscriber Identity Module card (SIM card), a memory card, an identity card or a card which is suitable for making purchases, etc. The cards may be of different sizes. For example, the SIM card has been standardized and has four typical sizes according to the standards: full-size SIM 1st form factor (1FF), mini-SIM 2nd form-factor (2FF), micro-SIM 3rd form-factor (3FF), and nano-SIM 4th form-factor (4FF). Similarly memory card families have been standardized into various sizes which may be characterized as standard, mini, micro, nano etc. Some pieces of electronic equipment using the integrated circuit card may also accept more than one integrated circuit card. In the following paragraphs, an abbreviated term "IC card" is used for an integrated circuit card which is intended to represent all types of integrated circuit cards of all sizes and varieties, including, but not limited to, SIM cards, memory cards, smart cards, payments cards, etc.

Typically, the IC card is removed by a user. For this reason, it may be desirable to provide an apparatus for a user to safely remove and replace the IC card without the risk of corrupting the IC card, such as a SIM card. There is a risk of data corruption if the connection to the IC card is unexpectedly interrupted. This may happen when the user ejects, completely or partially, the IC card while the apparatus holding the IC card is still on and possibly reading the IC card. In some devices, a switch may be used to give a warning to the program software before the user ejects the IC card. Further, another switch may be used to detect that the IC card is fully inserted. The warning may be used to shut down the apparatus. Further in some apparatuses, two separate devices may be used; one for giving the warning and another one for detecting that the IC card is fully inserted.

Figure 1A:
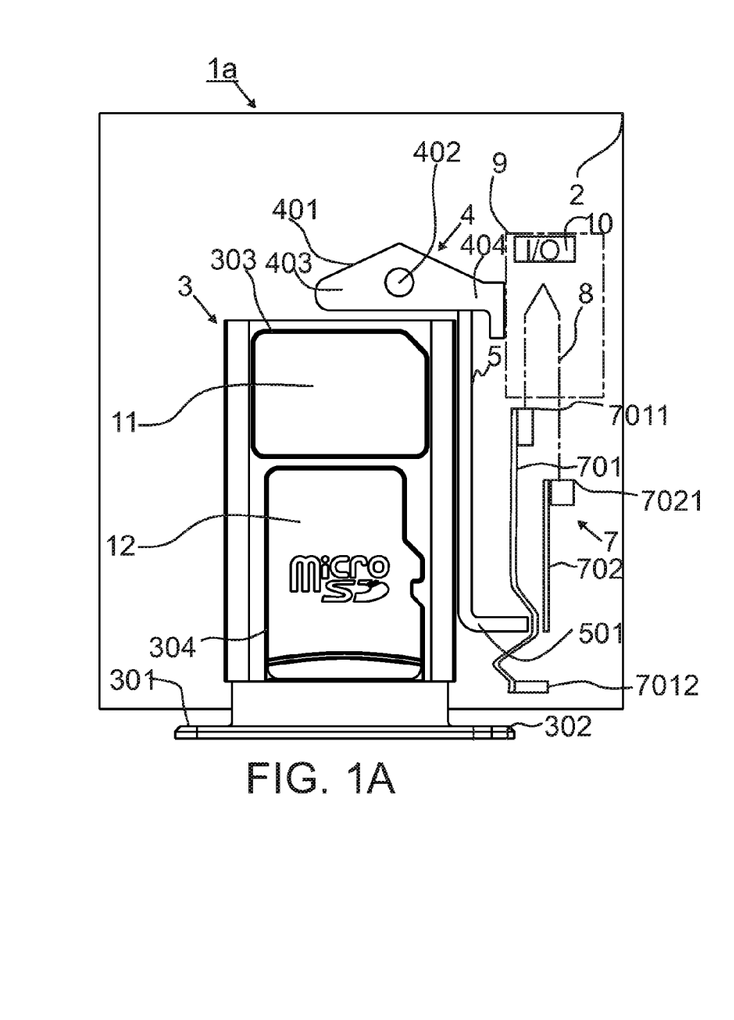
FIG. 1A is a schematical illustration of an embodiment, where a tray is in a retracted closed position inside an apparatus.

FIG. 1A is a schematical illustration of an embodiment, where a tray 3 is in a retracted closed position inside an apparatus 1a. FIG. 1A represents an initial stationary position of the tray 3. The apparatus 1a comprises a housing 2 and the tray 3 which is connected to the housing 2 in a movable manner. The tray 3 has a retracted closed position and an ejected open position with respect to the housing 2. Further, the apparatus comprises an ejector 4 configured to eject the tray 3 to the ejected open position. The ejector 4 may be a lever 401 or a similar type of device configured to push the tray 3 to the ejected open position. The tray 3 may carry for example two IC cards. The tray 3 may carry a SIM card 11 and additionally or alternatively a memory card 12 as illustrated in the example of the apparatus 1a in FIG. 1A. The SIM card 11 and the memory card 12 are releasably attached to the tray 3 and to slots 303, 304.

Figure 1B:
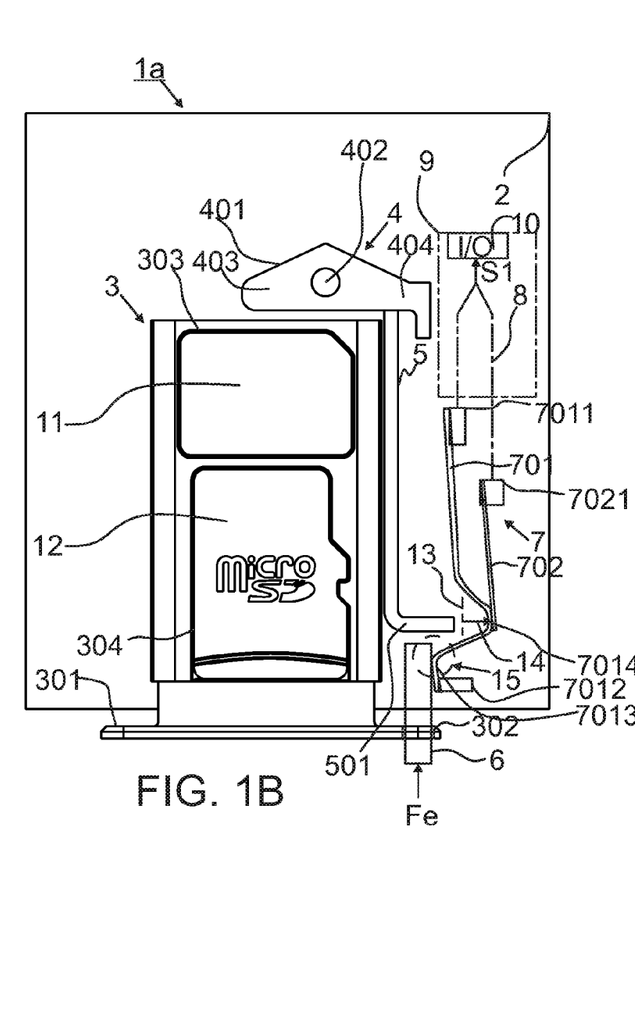
FIG. 1B is a schematical illustration of an embodiment, where a tray is in a retracted closed position and where an opening tool is inserted inside the apparatus.

FIG. 1B is a schematical example illustration of an embodiment, where the tray 3 is in a retracted closed position and where an opening tool 6 is inserted inside the apparatus 1a. Further, the apparatus 1a comprises a push member 5 configured to operate the ejector 4 to eject the tray 3 to the ejected open position when an external force Fe is applied to the push member 5 with the opening tool 6. The push member 5 may be a rod or cylindrical shaped solid piece or a plate with a shaped portion for receiving the external force Fe and for closing the switch 7. In some embodiment, the push member 5 may be made out of metal or plastic. The shaped portion may be formed by bending, whereby the shaped portion is a bent portion 501 as illustrated in FIGS. 1A and 1B. The push member 5 has a first position and a second position, wherein the push member 5 is in the first position when the tray 3 is in the retracted closed position. The push member 5 is configured to receive the external force Fe for moving the push member 5 into the second position and to operate the ejector 4 to eject the tray 3 to the ejected open position when the push member 5 is moved to the second position. The push member 5 is further configured to stay in the second position and maintain the second position even when the external force Fe is removed. The tray 3 comprises a handle 301 comprising an opening 302 structured to receive the opening tool 6 for applying the external force Fe with the opening tool 6 to eject the tray 3. The opening may be, for example, a through hole or similar type of structure for receiving the opening tool 6. The opening tool 6 may be, for example, a pin or a bar or similar type of structure. The detection of insertion of the opening tool 6, which indicates that the tray 3 is about to be ejected, and the detection of the tray 3 being in the closed retracted position is enabled by a switch 7. The switch 7 has a first electric position and a second electric position. The first electric position, illustrated in FIG. 1B and indicated with an arrow 14, is a closed position of the switch 7. The second position illustrated in FIG. 1A is an open position of the switch 7. The switch 7 is configured to receive the external force Fe and to switch to the first electric position in response to receiving the external force Fe, and the push member 5 is configured to maintain the switch 7 in the first electric position in response to the push member 5 being moved to the second position.

When the tray 3 is returned back to the retracted closed position by the user, the push member 5 is moved back to the first position, which causes the switch 7 to switch from the first electric position to the second electric position. The switch 7 comprises a first electric contact element 701 and a second electric contact element 702. When the external force Fe pushes the opening tool 6 up to the position of a first bent portion 7013 of the first electric contact element 701, the opening tool 6 causes the first electric contact element 701 to close the switch 7 by moving the first electric contact element 701 into contact with the second electric contact element 702. An electrical connection between the first electric contact element 701 and the second electric contact element 702 is enabled before the external force Fe is applied to the push member 5, which enables information to be indicated that the tray 3 is about to be ejected. In another embodiment, opening 302 may be arranged into the housing 2 (not illustrated in FIG. 1B), whereby the handle may be structured narrower compared to the handle 301 illustrated in FIG. 1B.

In an embodiment, the electric contact elements 701, 702 may be, for example, contact springs. The contact elements may be made out of metal and they may have a gold plating on the surface of the metal. The push member 5 may be made out of a metal plate or a plastic plate, whereby the push member 5 is a push plate.

In an embodiment, the first electric contact element 701 is fixed from a first end 7011 and a second end 7012, for example, to soldered joints. The second electric contact element 702 is fixed from an end 7021, for example, to a solder joint. The first electric contact element 701 functions as a spring which is able to bend and return back to its initial position. Also the second electric contact element 702 may function as a spring. A second bent portion 7014 moves in contact with the second electric contact element 702 when the first electric contact element 701 is pushed by the opening tool 6 from the first bent portion 7013. Correspondingly, the second electric contact element 702 moves when it is pushed by the first electric contact element 701. A contact point between the opening tool 6 and the first bent portion 7013 is indicated inside a circle 15. The movement of the first bent portion 7013 is indicated with the arrow 14. The switch 7, when connected, closes an electric circuit 8 of a circuit board 9, enabling a first signal S1 indicating, that the tray 3 is about to be ejected. The first signal S1 may be a power off signal transmitted to a control unit 10 or a software module, such as a computer, which safely switches off the apparatus 1a.

Figure 1C:
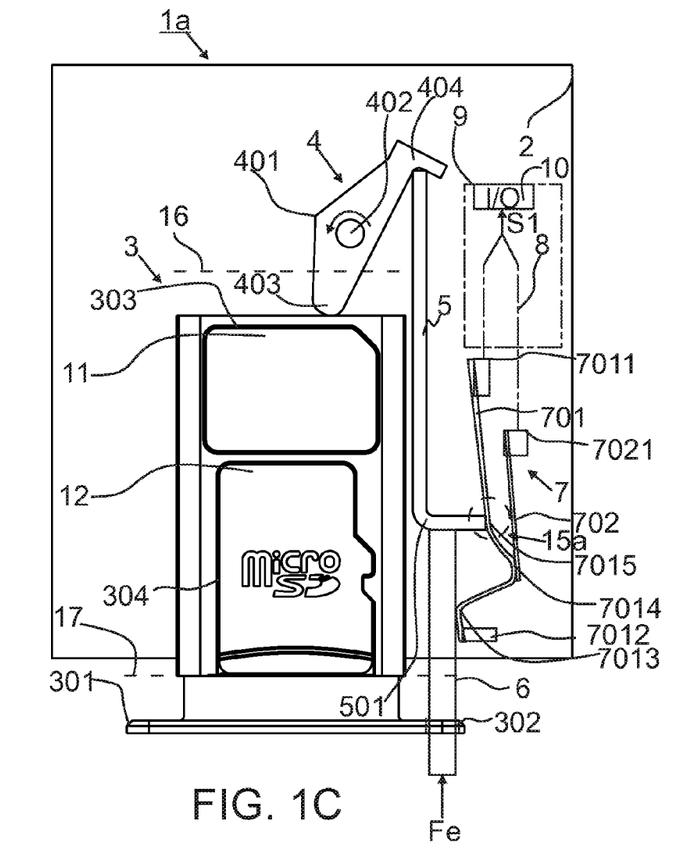
FIG. 1C is a schematical illustration of an embodiment, where a tray is in an ejected open position and where an opening tool is inserted inside the apparatus.

FIG. 1C is a schematical example illustration of an embodiment, where the tray 3 is in an ejected open position and where the opening tool 6 is inserted inside the apparatus 1a. The opening tool 6 is inserted to its extreme position inside the apparatus 1a. When the opening tool 6 is pushed further inside the apparatus 1a, it causes the ejector 4 to move, which pushes the tray 3 to the ejected open position. The ejector 4 may comprise a lever 401 comprising at least one pivotal connection 402 enabling the pivoting of the lever 401. The pivoting of the lever 401 causes the moving of the tray 3 to the ejected open position when the lever 401 is pivoted around the pivotal connection 402 in response to an external force Fe applied to the push member 5 with the opening tool 6. The pivotal connection 402 may be, in some embodiments, a hole around a shaft, which may function as a bearing. The shaft may be connected to the housing 2. The bent portion 501 of the push member 5 pushes a third bent portion 7015 of the first electric contact element 701 keeping the switch 7 closed. This contact point is indicated inside a circle 15a. The push member 5 is configured to maintain the switch 7 closed when the tray 3 is fully ejected to the open position.

Figure 1D:
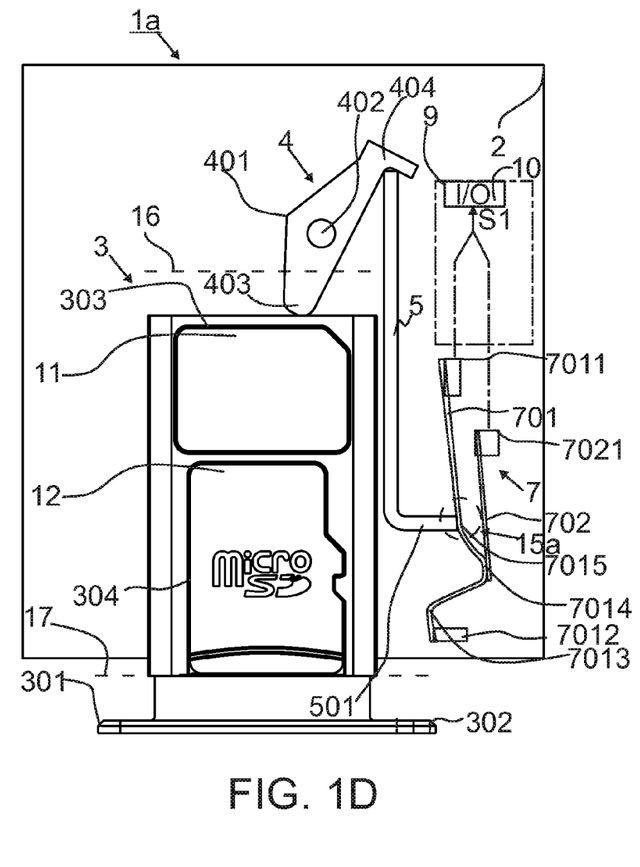
FIG. 1D is a schematical illustration of an embodiment where a tray is in an ejected open position and where an opening tool is removed from the apparatus.

FIG. 1D is a schematical example illustration of an embodiment, where the tray 3 is in an ejected open position and where the opening tool 6 is removed from the apparatus 1a. The push member 5 is configured to maintain the switch 7 closed when the tray 3 is fully ejected to the open position even after the opening tool 6 is removed by the user. In the above explained FIGS. 1B to 1D, the switch 7 is continuously connected. In some embodiments, the apparatus may be configured such that the switching of the switch 7 is opposite to what is disclosed in embodiments illustrated in FIGS. 1A to 1D. In this embodiment, the switching of the switch 7 may be configured in such a way that firstly the switch is opened when the external force Fe of the opening tool 6 is applied to the switch 7 and secondly the switch 7 is closed when the tray 3 is returned back to the retracted closed position (not illustrated in FIGS. 1A to 1D).

Figure 1E:
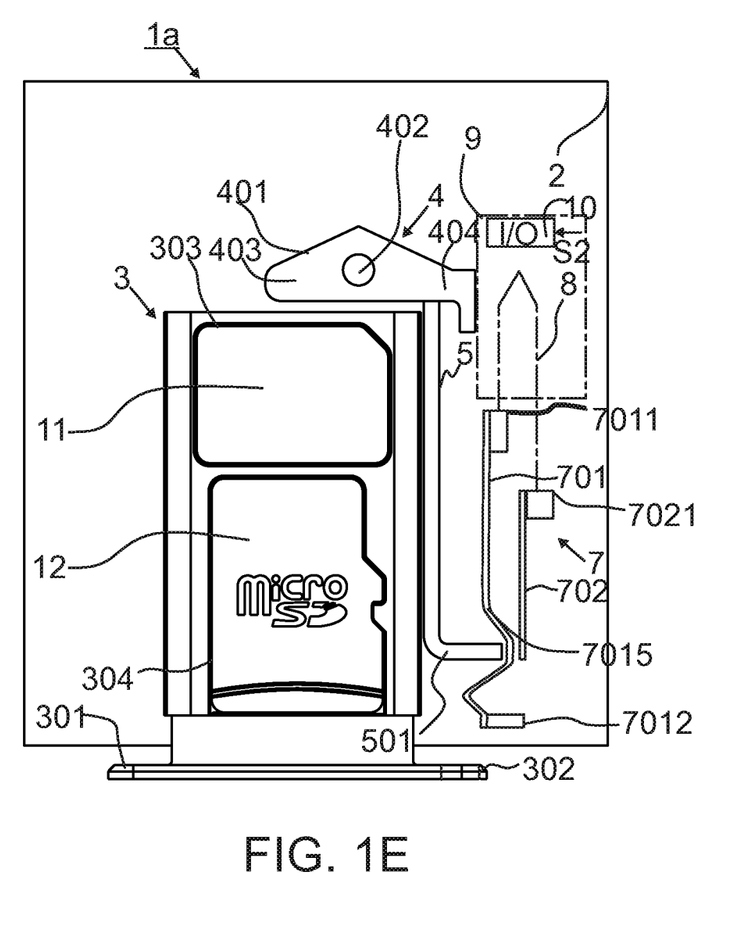
FIG. 1E is a schematical illustration of an embodiment, where a tray is returned back in a retracted closed position and where an opening tool is removed from the apparatus.

FIG. 1E is a schematical example illustration of an embodiment, where the tray 3 is returned back in a retracted closed position and where the opening tool 6 is removed from the apparatus 1a. The embodiment illustrated in FIG. 1E is similar to the embodiment illustrated in FIG. 1A with the exception that a second signal S2 is enabled, indicating that the tray 3 is back in the retracted closed position. The tray 3 is returned back to the retracted closed position by the user pushing the handle 301 of the tray 3. The push member 5 is configured to open the switch 7 by causing the first electric contact element 701 to disconnect contact with the second electric contact element 702 when the tray 3 is returned back to the retracted closed position. When the bent portion 501 of the push member 5 is no longer in contact with the first electric contact element 701, the first electric contact element 701 moves to its initial position and disconnects the switch 7. The switch 7, when disconnected, enables a second signal S2 which may comprise a software wake-up signal. The second signal S2 may be transmitted to a control unit 10 after the first signal S1 has ceased. The second signal S2 indicates that the tray 3 is fully inserted and the power of the apparatus may be safely turned back on. In some embodiment the second signal S2 is transmitted to the software of the control unit 10.

Figure 2A:
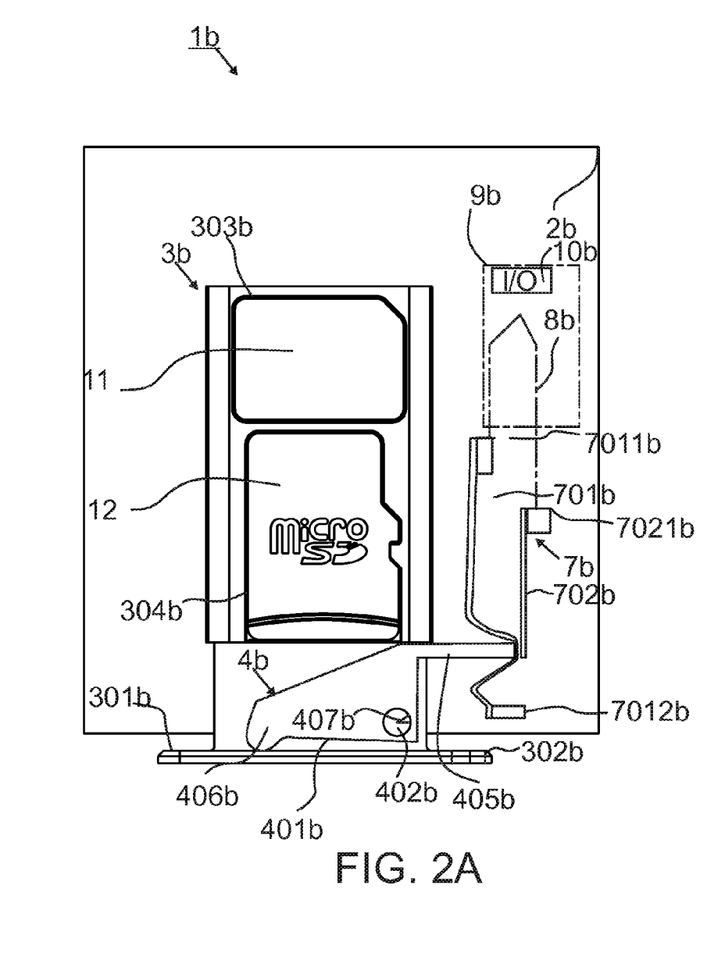
FIG. 2A is a schematical illustration of another embodiment, where a tray is in a retracted closed position inside an apparatus.
Figure 2B:
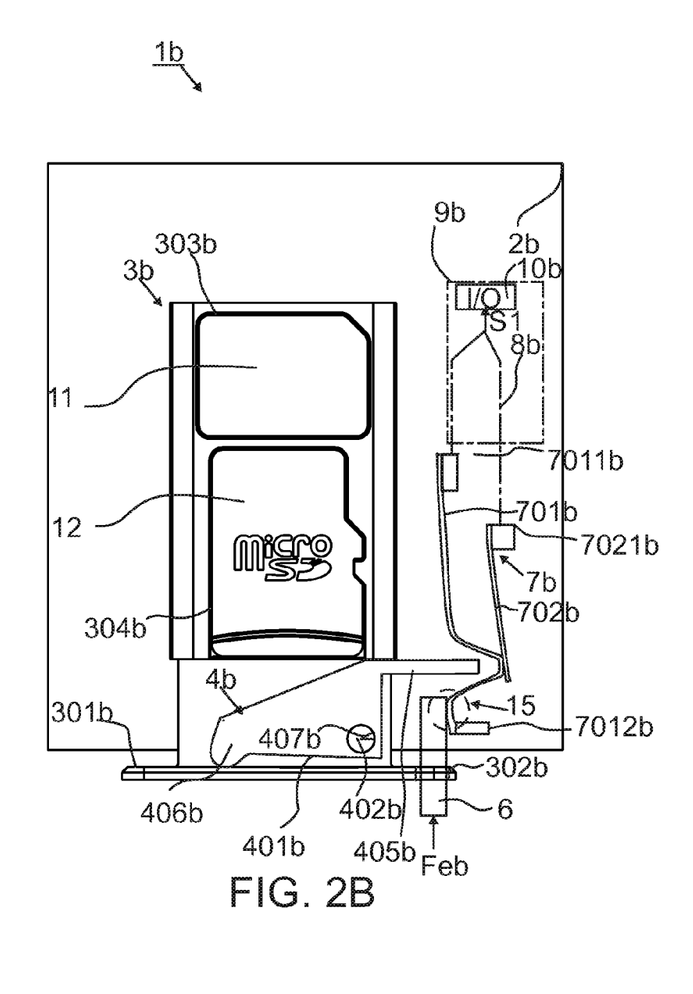
FIG. 2B is a schematical illustration of an embodiment, where a tray is in a retracted closed position and where an opening tool is inserted inside the apparatus.

FIG. 2A is a schematical example illustration of an embodiment, where a tray 3b is in a retracted closed position. FIG. 2B is a schematical example illustration of the apparatus 1b where the tray 3b is in a retracted closed position and where the opening tool 6 is inserted inside the apparatus 1b. The apparatus 1b illustrated in FIGS. 2A and 2B is similar to the apparatus 1a illustrated in FIGS. 1A and 1B with the exception that an ejector 4b is different and it is located in a different place in the apparatus 1b. Another exception is that no push member is utilized in the structure of the apparatus 1b. The switch 7b is disconnected in FIG. 2A. Similar to the embodiment illustrated in FIG. 1B, in FIG. 2B, the opening tool 6 causes the closing of the switch 7b. The ejector 4b is in connection with a handle 301b. The ejector 4b is configured to push the handle 301b when the tray 3b is ejected. The ejector 4b, in some embodiments, may be a lever 401b, is located near the handle 301b. The lever 401 may comprise a rotation stopper 407b which limits the rotation of the lever 401b to a predetermined position.

Figure 2C:
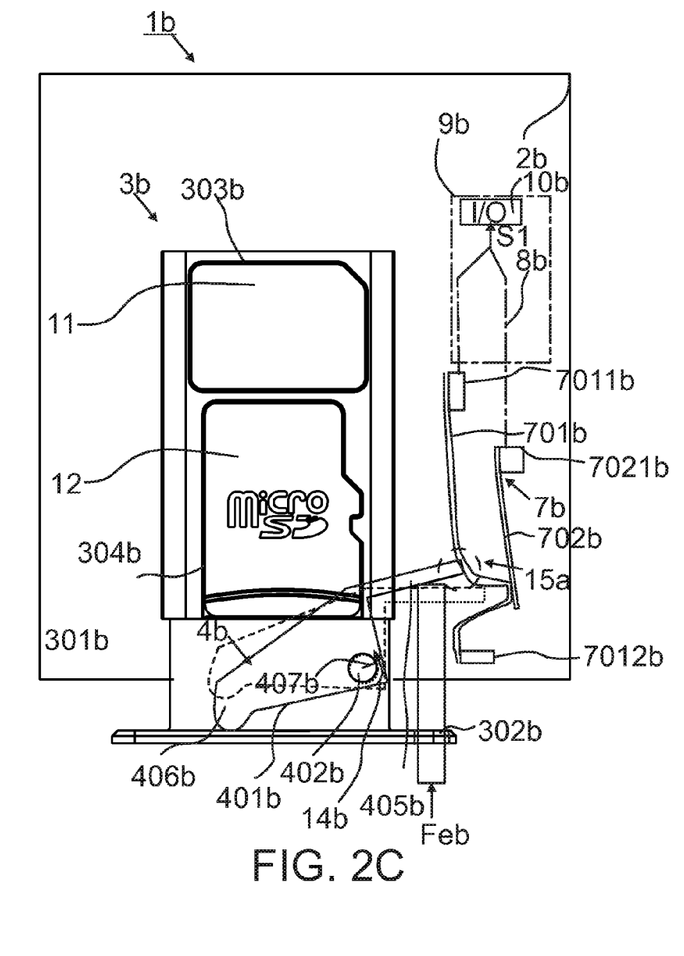
FIG. 2C is a schematical illustration of an embodiment, where a tray is in an ejected open position and where an opening tool is inserted inside the apparatus.

FIG. 2C is a schematical illustration of an embodiment, where the tray 3b is in an ejected open position and where the opening tool 6 is inserted inside the apparatus 1b. The apparatus 1b illustrated in FIG. 2C is similar to the embodiment illustrated in FIG. 1C with the exception that an extension 405b of the lever 401b maintains the switch 7b closed. When the tray 3b is in the ejected open position, the switch 7b is closed by the ejector 4b even after the opening tool 6 is removed. The rotation of the lever 401b is illustrated with an arrow 14b. The rotation stopper 407b limits the lever 401b from being rotated too far away from the first electric contact element 701b. The lever 401b is returned back to the initial position illustrated with a dashed line after the user removes the opening tool 6 and after the user has pushed the tray 3b back to the retracted closed position. The ejector 5b is configured to maintain the switch 7b in the first electric position when the ejector 5b is moved from the first position to the second position. When the tray 3b is returned back to the retracted closed position by the user, the ejector 5b is moved back to the first position which causes the switch 7b to switch from the first electric position to the second electric position. The ejector 4b is configured to open the switch 7b by causing the first electric contact element 701b to disconnect the contact with the second electric contact element 702b when the tray 3b is returned back to the retracted closed position. The switch 7b is opened when the extension 405b is no longer pushing the first electric contact element 701b.

Figure 3A:
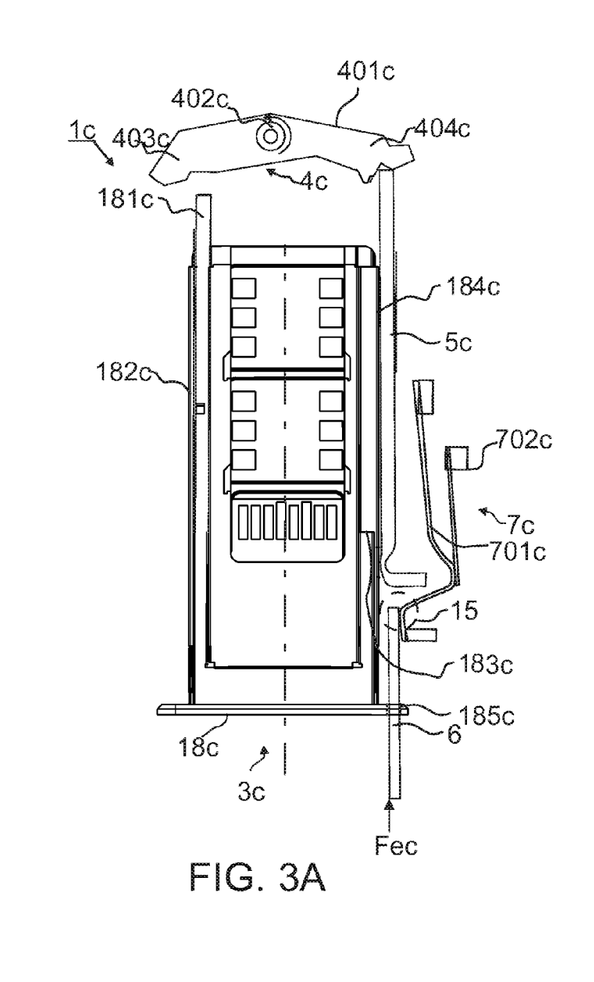
FIG. 3A is a schematical example illustration of another embodiment, where a handle is in a shortened closed position and where an opening tool is inserted inside the apparatus.

FIG. 3A is a schematical example illustration of an embodiment, where a handle 18c is in a shortened closed position and where the opening tool 6 is inserted inside the apparatus 1c. The embodiment illustrated in FIG. 3A is similar to the embodiment illustrated in FIG. 1B with the exception that no housing is utilized and the ejector 4c is configured to move only the handle 18c, while the tray 3c is kept in an unmoved position inside the apparatus 1c. Another exception is that the tray 3c is configured to carry three IC cards. Similar to the embodiment illustrated in FIG. 1A, the first electric contact element 701c is moved by the opening tool 6 causing an indication of imminent ejection of the tray. This event is indicated with the circle 15. The handle 18c comprises an opening 185c for inserting the opening tool 6 inside the apparatus 1c.

Figure 3B:
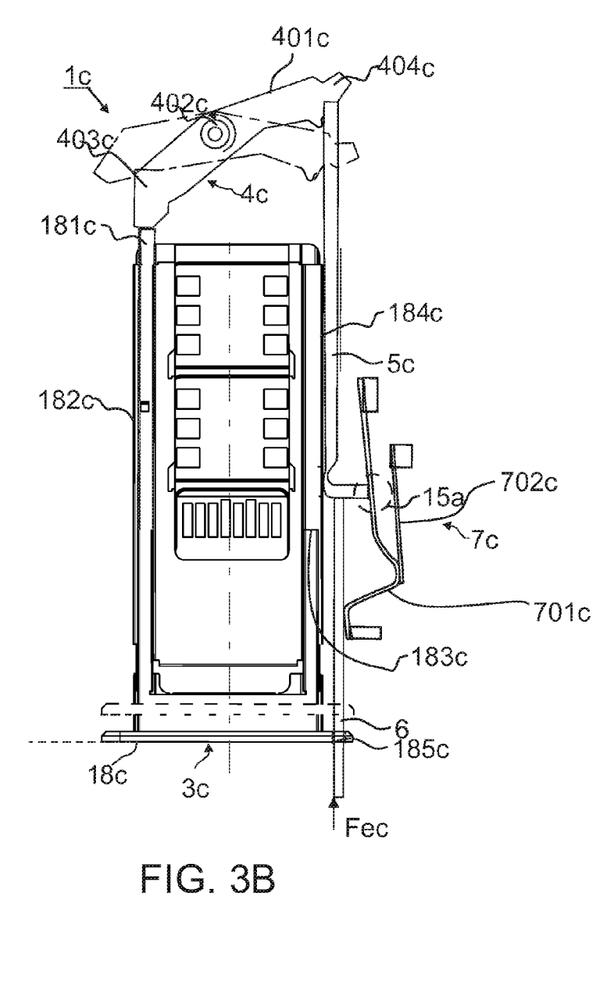
FIG. 3B is a schematical example illustration of an embodiment, where a handle is in an extended open position and where an opening tool is inserted inside the apparatus.

FIG. 3B is a schematical example illustration of an embodiment, where the handle 18c is in an extended open position and where the opening tool 6 is inserted inside the apparatus 1c. The handle 18c has been connected to the tray 3c in a slidable manner. The handle 18c may comprise telescopic members 181c, 183c which may be structured inside guide rails 182c, 184c of the tray 3c. The handle 3c may be moved in relation to the tray 3c by sliding the telescopic members 181c, 183c inside the guide rails 182c, 184c. The switch 7c is configured to receive an external force Fec and to switch to the first electric position in response to receiving the external force Fec, and the push member 5c is configured to maintain the switch 5c in the first electric position when the handle 18 *c* is ejected to the extended open position. When the handle 18c is returned back to the shortened closed position illustrated with the dashed line, the push member 5c is moved back to the first position causing the switch 7c to switch from the first electric position to the second electric position.

When the opening tool 6 is inserted far enough, the ejector 4c which may be a lever 401c, has pushed the handle 18c away from the tray 3c to the extended open position. The handle 18c is moved when the lever 401 c pushes the first telescopic part 181c with a first portion 403c of the lever 401c. The movement of the lever 401c causes the sliding of the handle 4c to the extended open position when the lever 401c is pivoted around the pivotal connection 402c. Similar to the embodiment illustrated in FIG. 1C, the opening tool 6 pushes a push member 5c which operates the ejector 4c. When the handle 18c is ejected to the extended open position and the push member 5c is in its possible extreme position, the first electric contact element 701c is kept in contact with the second electric contact element 702c by the push member 5c, which is indicated with the circle 15a. When the handle 18c is pushed back to a shortened closed position by the user, also the push member 5c is pushed back to its initial position, whereby the push member 5c opens the switch 7c by causing the first electric contact element 701c to disconnect the contact with the second electric contact element 702c. The shortened closed position is illustrated with dashed lines in FIG. 3B.

Figure 4A:
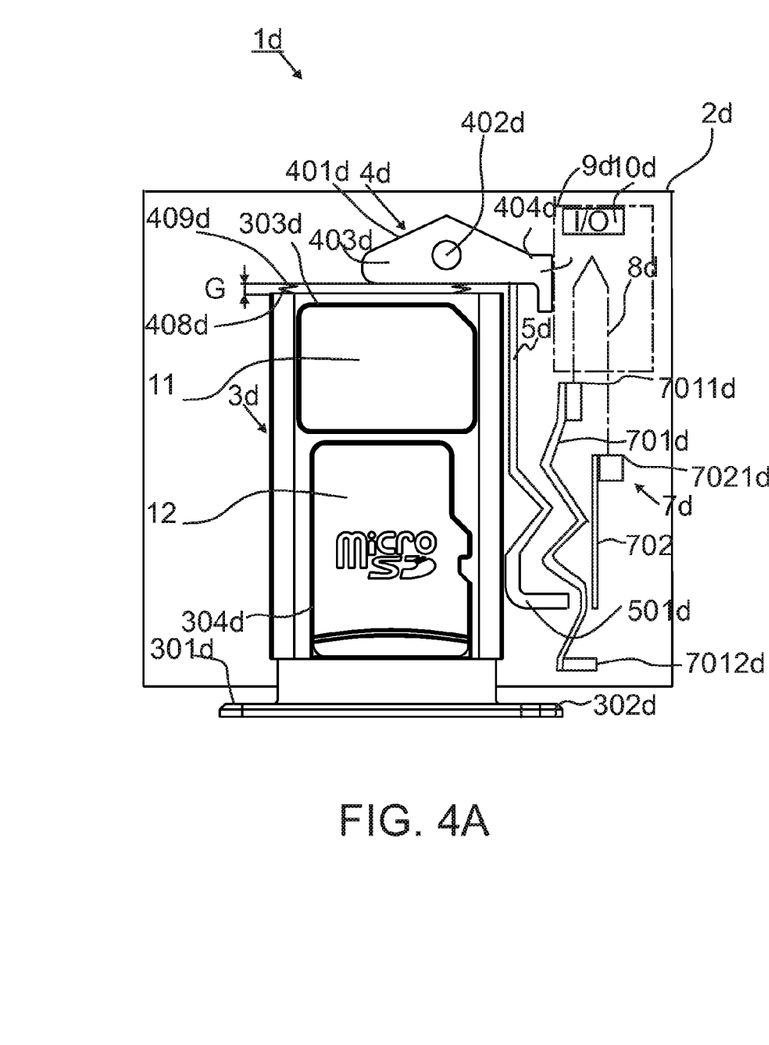
FIG. 4A is a schematical example illustration of another embodiment, where a tray is in a retracted closed position inside an apparatus.
Figure 4B:
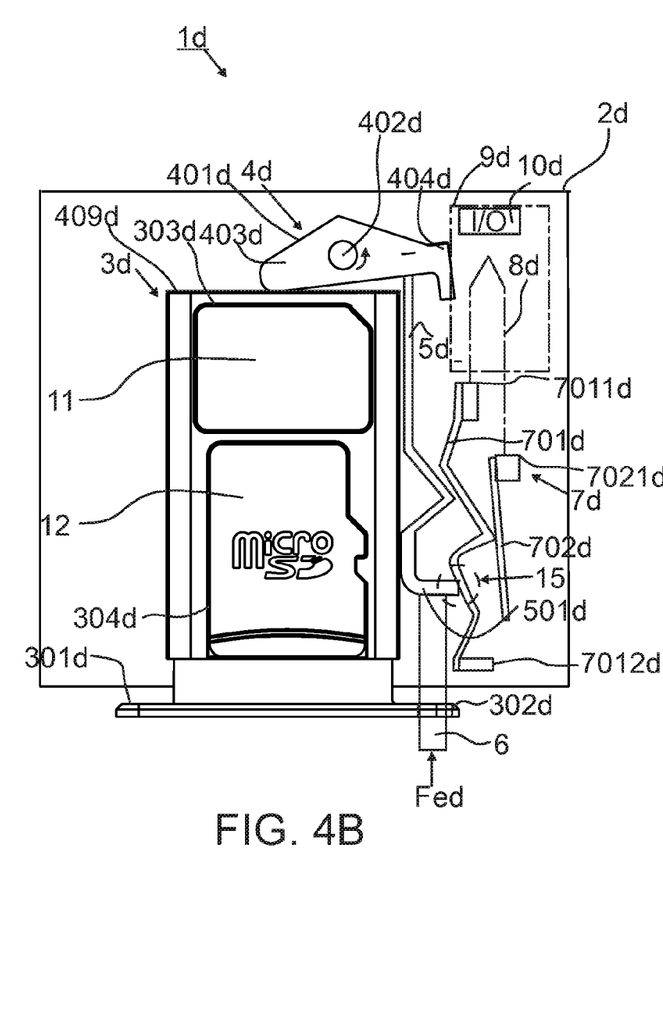
FIG. 4B is a schematical example illustration of an embodiment, where a tray is in a retracted closed position and where an opening tool is inserted inside the apparatus.
Figure 4C:
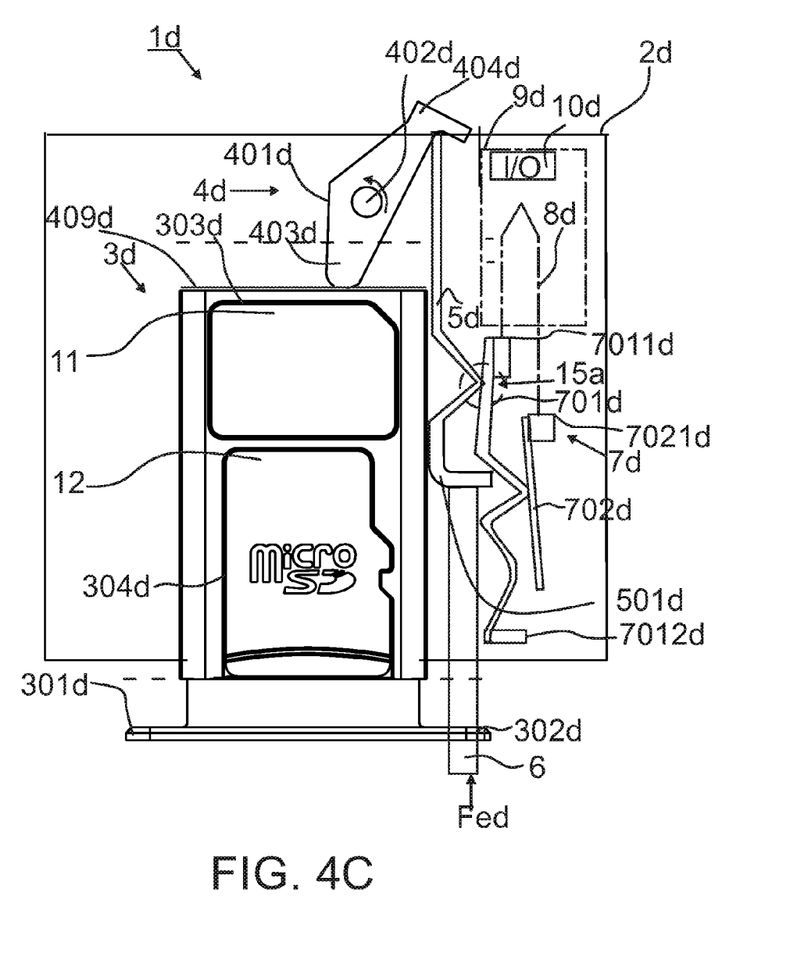
FIG. 4C is a schematical example illustration of an embodiment, where a tray is in an ejected open position and where an opening tool is inserted inside the apparatus.

FIG. 4A is a schematical example illustration of an embodiment, where a tray 3d is in a retracted closed position inside the apparatus 1d. FIG. 4B is a schematical example illustration of an embodiment, where the tray 3d is in a retracted closed position and where the opening tool 6 is inserted inside the apparatus 1d. FIG. 4C is a schematical example illustration of an embodiment, where the tray 3d is in an ejected open position and where the opening tool 6 is inserted inside the apparatus 1d. The mechanism of the embodiments illustrated in FIG. 4A, FIG. 4B and FIG. 4C is similar to that of the embodiments illustrated in FIG. 1A, FIG. 1B, and FIG. 1C, with the exception that the push member 5d is different from the push member 5 illustrated in FIG. 1A to 1C. Another exception is that the generation of indication of imminent ejection of the tray is done by the push member 5d and not the opening tool 6. The tray 3d comprises a plate 409d between the ejector 4d and the tray 3d and at least one spring 408d between the plate 409d and the tray 3d. This forms a gap G between the ejector 4d, such as a lever 401d, and the tray 3d. When the lever 401d is rotated with the push member 5d into a position where the gap G is pushed closed, the spring 409d is compressed. When the gap G is closed, the switch 7d is closed by the aid of the push member 5d pushing the first electric contact element 701d into contact with the second electric contact element 702c. At this point, the tray 3d is not yet moved. The connection point between the push member 5d and the first electric contact element 701d is illustrated inside the circle 15. Similar to the mechanism of embodiments illustrated in FIG. 1C, the switch 7d is kept closed by the push member 5d when the tray 3d is fully ejected. The connection point between the push member 5d and the first electric contact element 701d is illustrated inside the circle 15a. The push member 5d opens the switch 7d by causing the first electric contact element 701d to disconnect the contact with the second electric contact element 702d, when the tray 3d is returned back to the retracted closed position.

Figure 5A:
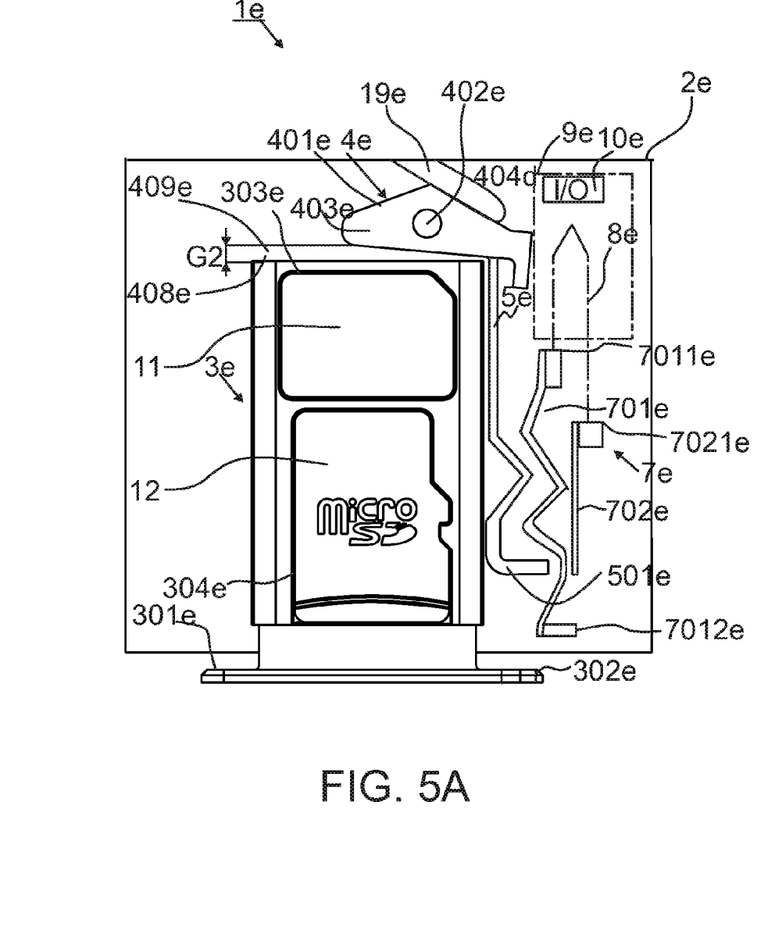
FIG. 5A is a schematical example illustration of another embodiment, where a tray is in a retracted closed position inside an apparatus.
Figure 5B:
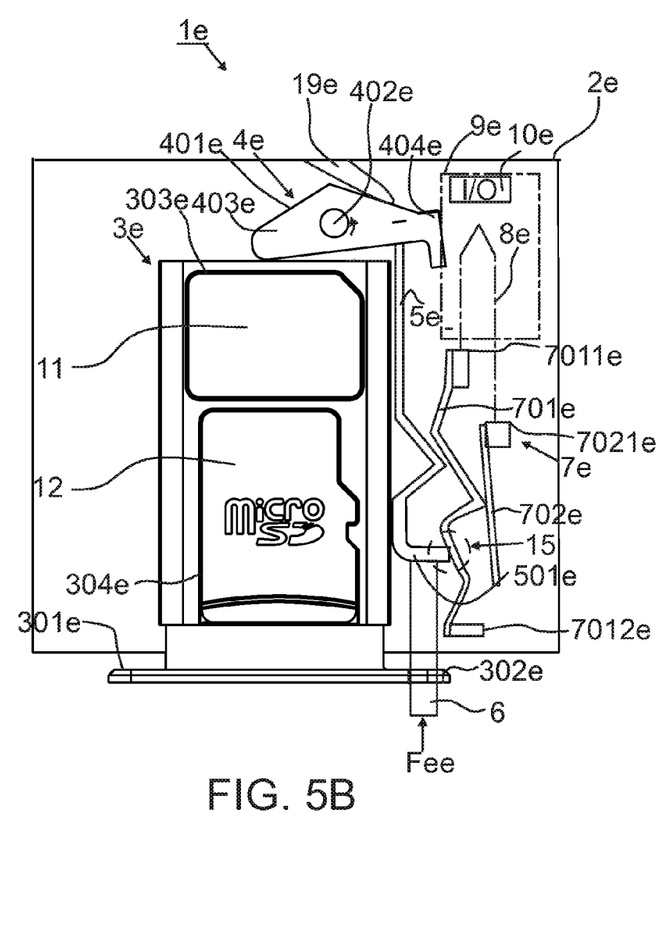
FIG. 5B is a schematical example illustration of an embodiment, where a tray is in a retracted closed position and where an opening tool is inserted inside the apparatus.
Figure 5C:
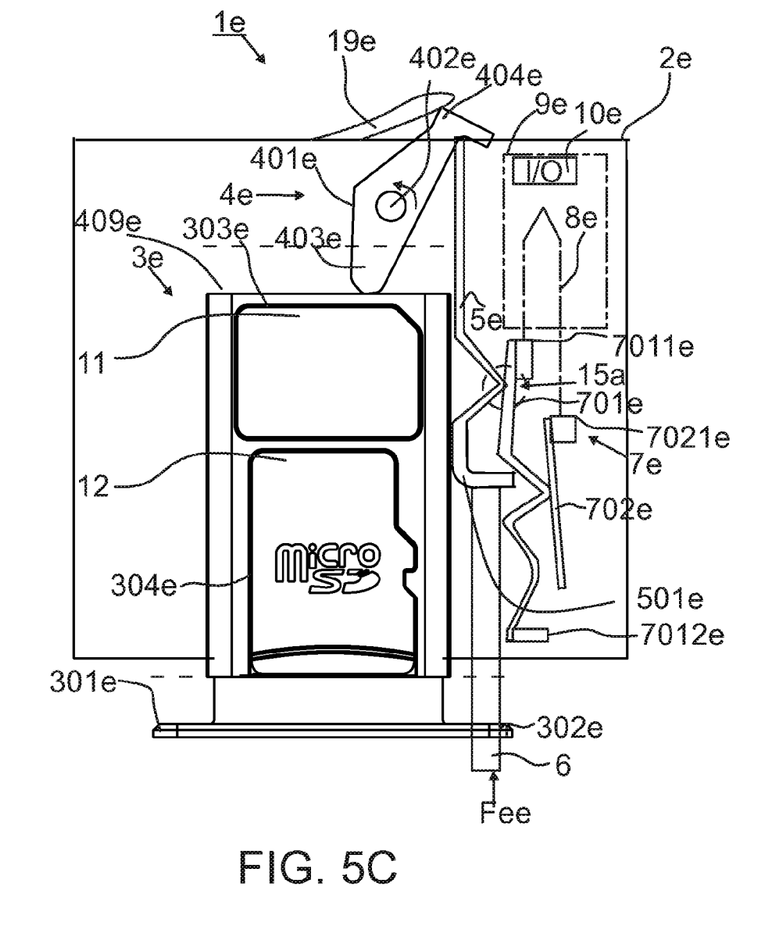
FIG. 5C is a schematical example illustration of an embodiment, where a tray is in an ejected open position and where an opening tool is inserted inside the apparatus.

FIG. 5A is a schematical example illustration of an embodiment, where a tray 3e is in a retracted closed position inside an apparatus 1e. FIG. 5B is a schematical example illustration of an embodiment, where the tray 3e is in a retracted closed position and where the opening tool 6 is inserted inside the apparatus 1e. FIG. 5C is a schematical example illustration of an embodiment, where the tray 3e is in an ejected open position and where the opening tool 6 is inserted inside the apparatus 1e. The embodiments illustrated in FIG. 5A, FIG. 5B and FIG. 5C are similar to embodiments illustrated in FIG. 4A FIG. 4B, with the exception that the gap is implemented differently. The housing 2e comprises a flap 19e which functions as a spring moving the ejector 4e away from the tray 3e. A gap G2 is thereby formed between the ejector 4e and the tray 3e. The operation in embodiments illustrated in FIGS. 5B and 5C is similar to the ones illustrated in FIGS. 4B and 4C and are not thereby explained further.

In one or more of the above embodiments, the tray 3, 3b, 3c, 3d, 3e or the handle 18c of the apparatus 1a, 1b, 1c, 1d, 1e may be ejected with an opening tool 6 by means of the ejector 4, 4b, 4c, 4d, 4e and may be pushed back by the user, and the apparatus 1a, 1b, 1 c, 1d, 1 e comprises only one switch 7, 7b, 7c, 7d, 7e which firstly detects that the tray 3, 3b, 3c, 3d, 3e or the handle 18c is about to be ejected and secondly detects that the tray 3, 3b, 3c, 3d, 3e or the handle 18c is closed to the closed position. If the tray 3, 3b, 3c, 3d, 3e carries an IC card or IC cards, they may be removed from the apparatus 1a, 1b, 1c, 1d, 1e, without the risk of corrupting the IC card. Even if the user ejects the IC card when the apparatus 1a, 1b, 1c, 1d, 1e is powered, the ejection of the IC card may be done safely.

Further, the apparatus 1a, 1b, 1c, 1d, 1e has a simple structure. The functionality of the switch 7, 7b, 7c, 7d, 7e may be accomplished by using only one structure and not two or more separate devices. In electronic equipment, space may be limited. When the number of parts is reduced in the electronic equipment, the electronic equipment may be constructed smaller. The reducing of components inside the electronic equipment is useful and may results in savings from an economical point of view.

The apparatus 1a, 1b, 1c, 1d, 1e disclosed in the embodiments above is useful in a solution where the apparatus 1a, 1b, 1c, 1d, 1e is used as a card tray module for an electronic communication device, such as a smart phone or a tablet or a smart wearable. The apparatus 1a, 1b, 1c, 1d, 1e is particularly useful when the electronic communication device utilizes at least two IC cards. The IC card may be a subscriber identity module card (SIM card), a full-size SIM 1st form factor (1FF) card, a mini-SIM 2nd form factor (2FF) card, a micro-SIM 3rd form-factor (3FF) card, a nano-SIM 4th form-factor (4FF) card, a secure digital card (SD card), a mini secure digital card (miniSD card), a micro secure digital card (microSD card), a memory card, a storage card, and an expanded external memory card.

Although the embodiments illustrated in FIGS. 1A-5C describe the apparatus 1a, 1b, 1c, 1d, 1e disclosed with the opening 302, 302b, 185c, 302d, 302e structured in the handle 301, 301b, 18c, 301d, 301e, the opening 302, 302b, 185c, 302d, 302e may be, in some embodiments, structured in the housing 2, 2b, 2c, 2d, 2e, for example in a cover of the housing 2, 2b, 2c, 2d, 2e or in a separate cover outside the housing 2, 2b, 2c, 2d 2e (not illustrated in FIGS. 1A-5C).

An embodiment of an apparatus comprises a housing; a tray connected to the housing in a movable manner, the tray having a retracted closed position and an ejected open position with respect to the housing; an ejector configured to eject the tray to the ejected open position; a push member having a first position and a second position, wherein the push member is in the first position when the tray is in the retracted closed position, the push member is configured to receive an external force for moving the push member into the second position and to operate the ejector to eject the tray to the ejected open position in response to the push member being moved to the second position, and the push member is further configured to stay in the second position and maintain the second position even when the external force is removed; and a switch comprising a first electric position and a second electric position; wherein the switch is configured to receive the external force and to switch to the first electric position in response to receiving the external force, and the push member is configured to maintain the switch in the first electric position in response to the push member being moved to the second position and cause the ejection of the tray to the ejected open position; and wherein, in response to the tray being returned back to the retracted closed position, the push member is moved back to the first position causing the switch to switch to the second electric position.

An embodiment of an apparatus comprises a housing; a tray connected to the housing in a movable manner, the tray having a retracted closed position and an ejected open position with respect to the housing; an ejector configured to eject the tray to the ejected open position; a push member configured to operate the ejector to eject the tray to the ejected open position when an external force is applied to the push member with an opening tool; a switch comprising a first electric contact element and a second electric contact element; wherein the electric contact element is configured to be caused to move by the opening tool to close the switch by causing the first electric contact element to come in contact with the second electric contact element when the external force is applied to the first electric contact element with the opening tool and before the external force is applied to the push member, and the push member is configured to maintain the switch closed when the tray is ejected to the open position; and wherein, when the tray is returned back to the retracted closed position, the push member is caused to open the switch by causing the first electric contact element to disconnect the contact with the second electric contact element.

In one embodiment, the ejector comprises a lever comprising at least one pivotal connection enabling the pivoting of the lever, causing the moving of the tray to the ejected open position when the lever is pivoted around the at least one pivotal connection in response to the external force applied to the push member with an opening tool.

In one embodiment, the push member is configured to operate the ejector to eject the tray to the ejected open position when the external force is applied to the push member with an opening tool.

In one embodiment, the switch comprises a first electric contact element and a second electric contact element.

In one embodiment, at the first electric position the first electric contact element is configured to be caused to move by the opening tool to close the switch by causing the first electric contact element to come in contact with the second electric contact element when the external force is applied to the first electric contact element with an opening tool and before the external force is applied to the push member.

In one embodiment, at the second electric position the push member has been moved back to the first position causing the switch to switch back from the first electric position to the second electric position and further causing the first electric contact element to disconnect the contact with the second electric contact element.

In one embodiment, the switch, when connected, is configured to close an electric circuit of a circuit board, enabling a first signal informing that the tray is about to be ejected.

In one embodiment, the switch, when disconnected, enables a second signal informing that the tray is back in the retracted closed position.

In one embodiment, the first signal comprises a power off signal.

In one embodiment, the switch, when disconnected, enables a second signal comprising a software wake-up signal being transmitted to a control unit after the first signal has ceased.

In one embodiment, the tray comprises a handle comprising an opening structured to receive an opening tool for applying the external force with the opening tool to eject the tray.

In one embodiment, at least one of the first electric contact element and the second electric contact element is structured to function as a spring which is configured to move when pressed by the external force.

In one embodiment, the first electric contact element comprises a first contact spring and the second electric contact element comprises a second contact spring.

In one embodiment, at least one of the first electric contact element and the second electric contact element is made out of metal comprising a gold plating.

In one embodiment, the push member comprises a push plate.

In one embodiment, the tray is structured to releasably receive at least one of an integrated circuit card, a subscriber identity module card, a secure digital card, a memory card, a storage card, and an expanded external memory card.

In one embodiment, an electronic device comprises the apparatus.

In one embodiment, the apparatus further comprises an electronic device, the electronic device comprising the tray, the ejector, the push member, and the switch.

An embodiment of an apparatus comprises a housing; a tray connected to the housing in a movable manner, the tray having a retracted closed position and an ejected open position with respect to the housing; an ejector configured to eject the tray to the ejected open position and having a first position and a second position, wherein the ejector is in the first position when the tray is in the retracted closed position, the ejector is configured to receive an external force for moving the ejector into the second position and for moving the tray into the ejected open position and is further configured to stay in the second position and maintain the second position even when the external force is removed; and a switch comprising a first electric position and a second electric position; wherein the switch is configured to receive the external force and to switch to the first electric position in response to receiving the external force, and the ejector is configured to maintain the switch in the first electric position in response to the ejector being moved to the second position; and wherein, in response to the tray being returned back to the retracted closed position, the ejector is moved back to the first position causing the switch to switch to the second electric position.

An embodiment of an apparatus comprises a housing; a tray connected to the housing in a movable manner, the tray having a retracted closed position and an ejected open position with respect to the housing; an ejector configured to eject the tray to the ejected open position when an external force is applied to the ejector with an opening tool; a switch comprising a first electric contact element and a second electric contact element; wherein the first electric contact element is configured to be caused to move by the opening tool to close the switch by causing the first electric contact element to come in contact with the second electric contact element when the external force is applied to the first electric contact element with the opening tool and before the external force is applied to the ejector, and the ejector is configured to maintain the switch closed when the tray is ejected to the open position; and wherein, when the tray is returned back to the retracted closed position, the ejector is caused to open the switch by causing the first electric contact element to disconnect the contact with the second electric contact element when the tray is returned back to the retracted closed position.

In one embodiment, the ejector is configured to eject the tray to the ejected open position when an external force is applied to the ejector with an opening tool.

In one embodiment, the switch comprises a first electric contact element and a second electric contact element; wherein at the first electric position the first electric contact element is configured to be caused to move by the opening tool to close the switch by causing the first electric contact element to come in contact with the second electric contact element when the external force is applied to the first electric contact element with the opening tool and before the external force is applied to the ejector; and wherein, at the second electric position the ejector has been returned back to the first position causing the switch to switch back from the first electric position to the second electric position and further causing the first electric contact element to disconnect the contact with the second electric contact element.

In one embodiment, the apparatus comprises a handle, wherein the ejector is configured to push the handle when the tray is ejected.

An embodiment of an apparatus comprises: a tray; a handle connected to the tray in a slidable manner, the handle having a shortened closed position and an extended open position with respect to the tray; an ejector configured to eject the handle to the extended open position; a push member configured to push the ejector to eject the handle to the extended open position and having a first position and a second position, wherein the push member is in the first position when the handle is in the shortened closed position, the push member is configured to receive an external force for moving the push member into the second position and to operate the ejector to eject the handle to the extended open position and is further configured to stay in the second position and maintain the second position even when the external force is removed; a switch comprising a first electric position and a second electric position; wherein the switch is configured to receive the external force and to switch to the first electric position in response to receiving the external force, and the push member is configured to maintain the switch in the first electric position in response to the handle being ejected to the extended open position; and wherein, in response to the handle being returned back to the shortened closed position, the push member is moved back to the first position causing the switch to switch from the first electric position to the second electric position.

An embodiment of an apparatus comprises a tray; a handle connected to the tray in a slidable manner and having a shortened closed position and an extended open position with respect to the tray; an ejector configured to eject the handle to the extended open position; a push member configured to push the ejector to eject the handle to the extended open position when an external force is applied to the push member with an opening tool; a switch comprising a first electric contact element and a second electric contact element; wherein the first electric contact element is configured to be caused to move by the opening tool to close the switch by causing the first electric contact element to come in contact with the second electric contact element when the external force is applied to the first electric contact element with the opening tool and before the external force is applied to the push member, and the push member is configured to maintain the switch closed when the handle is ejected to the open position; and wherein, when the handle is returned back to the shortened closed position, the push member is caused to open the switch by causing the first electric contact element to disconnect the contact with the second electric contact element when the handle is returned back to the shortened closed position.

In one embodiment, the switch comprises a first electric contact element and a second electric contact element; wherein at the first electric position the electric contact element is configured to be caused to move by the opening tool to close the switch by causing the first electric contact element to come in contact with the second electric contact element when the external force is applied to the first electric contact element and before the external force is applied to the ejector; and wherein, at the second electric position the push member has been returned back to the first position causing the switch to switch back from the first electric position to the second electric position and further causing the first electric contact element to disconnect the contact with the second electric contact element.

In one embodiment, the ejector comprises at least one lever, wherein the at least one lever comprises at least one pivotal connection enabling pivoting of the at least one lever, causing the sliding of the handle to the extended open position when the at least one lever is pivoted around the pivotal connection.

In one embodiment, the handle comprises an opening structured to receive an opening tool for applying the external force with the opening tool to eject the handle.

An embodiment of an apparatus comprises a housing; a tray connected to the housing in a movable manner, the tray having a retracted closed position and an ejected open position with respect to the housing; an ejector configured to eject the tray to the ejected open position; a push member having a first position and a second position, wherein the push member is in the first position when the tray is in the retracted closed position, the push member is configured to receive an external force for moving the push member into the second position and to operate the ejector to eject the tray to the ejected open position in response to the push member being moved to the second position, and the push member is further configured to stay in the second position and maintain the second position even when the external force is removed; and a switch comprising a first electric position and a second electric position; wherein the switch is configured to receive the external force and to switch to the first electric position in response to the push member being applied by the external force and before the tray is being moved to the ejected open position; and wherein, in response to the tray being returned back to the retracted closed position, the push member is moved back to the first position causing the switch to switch to the second electric position.

An embodiment of an apparatus comprises a housing; a tray connected to the housing in a movable manner, the tray having a retracted closed position and an ejected open position with respect to the housing; an ejector configured to eject the tray to the ejected open position; a push member configured to operate the ejector to eject the tray to the ejected open position when an external force is applied to the push member with an opening tool; a switch comprising a first electric contact element and a second electric contact element; wherein the first electric contact element is configured to be caused to move by the push member to close the switch by causing the first electric contact element to come in contact with the second electric contact element before the tray is ejected to the open position, and the push member is configured to maintain the switch closed when the tray is ejected to the open position; and wherein, when the tray is returned back to the retracted closed position, the push member is caused to open the switch by causing the first electric contact element to disconnect the contact with the second electric contact element when the tray is returned back to the retracted closed position.

Although the subject matter has been described in a language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments or a combination thereof. The embodiments are not limited to those that solve any or all of the stated problems or those that have any or all of the stated benefits and advantages.

Aspects of any of the embodiment described above may be combined with aspects of any of the other embodiment described to form further embodiment without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one embodiment may also be connected in any combination to any other embodiment.

The invention claimed is:

1. An apparatus comprising:
a housing;
a tray connected to the housing in a movable manner, the tray having a retracted closed position and an ejected open position with respect to the housing;
a push member having a first position and a second position, wherein the push member is in the first position as the tray is in the retracted closed position, the push member is configured to receive an external force for moving the push member into the second position and to operate an ejector to eject the tray to the ejected open position in response to the push member being moved to the second position, and the push member is further configured to stay upon removal of the external force; and
a switch movable into a first electric position and a second electric position, the switch comprising a first electric contact element and a second electric contact element;
wherein the first electric element is configured to move into contact with the second electric contact element upon application of the external force to the first electric contact element and before the external force is applied to the push member, and the push member is configured to receive the external force and, in response to the push member being moved to the second position, the push member is configured to maintain the switch in the first electric position and cause the ejection of the tray to the ejected open position; and
wherein, in response to the tray being returned to the retracted closed position, the push member is configured to cause the switch to switch to the second electric position.

2. The apparatus according to claim 1, wherein the push member is configured to operate the ejector to eject the tray to the ejected open position when the external force is applied to the push member with an opening tool.

3. The apparatus according to claim 1, wherein the external force is applied by an opening tool.

4. The apparatus according to claim 1, wherein, at the second electric position, the push member has been returned back to the first position causing the switch to switch back from the first electric position to the second electric position and further causing the first electric contact element to disconnect the contact with the second electric contact element.

5. The apparatus according to claim 4, wherein at the second electric position the push member has been moved back to the first position causing the switch to switch back from the first electric position to the second electric position and further causing the first electric contact element to disconnect the contact with the second electric contact element.

6. The apparatus according to claim 1, wherein the ejector comprises a lever comprising at least one pivotal connection enabling the pivoting of the lever, causing the moving of the tray to the ejected open position when the lever is pivoted around the at least one pivotal connection in response to an external force applied to the push member with an opening tool.

7. The apparatus according to claim 1, wherein the switch, when connected, is configured to close an electric circuit of a circuit board, enabling a first signal indicating that the tray is about to be ejected.

8. The apparatus according to claim 1, wherein the switch, when disconnected, enables a second signal indicate that the tray is back in the retracted closed position.

9. The apparatus according to claim 7, wherein the first signal comprises a power off signal.

10. The apparatus according to claim 7, wherein the switch, when disconnected, enables transmission of a second signal to a control unit after the first signal has ceased.

11. The apparatus according to claim 1, wherein the tray comprises a handle comprising an opening structured to receive an opening tool for applying the external force with the opening tool to eject the tray.

12. The apparatus according to claim 1, wherein the tray is structured to releasably receive at least one of an integrated circuit card, a subscriber identity module card, a secure digital card, a memory card, a storage card, and an expanded external memory card.

13. The apparatus according to claim 1, wherein the apparatus is a card tray module for an electronic communication device.

14. The apparatus according to claim 1, further comprising an electronic device, the electronic device comprising the tray, the ejector, the push member, and the switch.

15. An apparatus comprising:
a housing;
a tray connected to the housing in a movable manner, the tray having a retracted closed position and an ejected open position with respect to the housing;
an ejector configured to eject the tray to the ejected open position and having a first position and a second position, wherein the ejector is in the first position as the tray is in the retracted closed position, the ejector being configured for moving the tray into the ejected open position and being further configured to stay in the second position upon removal of an external force; and
a switch movable into a first electric position and a second electric position, the switch comprising a first contact element and a second contact element;
wherein the first electric contact element is configured to move into contact with the second electric contact element upon application of the external force to the first electric contact element and before the external force is applied to the push member, and, in response to the push member being moved to the second position, the push member is configured to maintain the switch in the first electric position and cause the ejector to eject the tray to the ejected open position; and
wherein, in response to the tray being returned back to the retracted closed position, the ejector is configured to move back to the first position, causing the switch to switch to the second electric position.

16. The apparatus according to claim 15, wherein the ejector is configured to eject the tray to the ejected open position when the external force is applied to the ejector with an opening tool.

17. The apparatus according to claim 16,
wherein, at the second electric position the ejector has been returned back to the first position causing the switch to switch back from the first electric position to the second electric position and further causing the first electric contact element to disconnect the contact with the second electric contact element.

18. An apparatus comprising:
a tray;
a handle connected to the tray in a slidable manner, the handle having a shortened closed position and an extended open position with respect to the tray;
a push member configured to push an ejector to eject the handle to the extended open position and having a first position and a second position, wherein the push member is in the first position as the handle is in the shortened closed position, the push member being configured for moving the handle into the extended open position and being further configured to stay in the second position upon removal of an external force;
a switch movable into a first electric position and a second electric position, the switch comprising a first electric contact element and a second electric contact element;
wherein the first electric contact element is configured to be moved into contact with the second electric contact element upon application of the external force to the first electric contact element and before the external force is applied to the push member, and the push member is configured to receive the external force maintain the switch in the first electric position in response to the push member being moved to the second position; and
wherein, in response to the handle being returned back to the shortened closed position, the push member is configured to move back to the first position causing the switch to switch from the first electric position to the second electric position.

19. The apparatus according to claim 18,
wherein, at the second electric position, the push member has been returned back to the first position causing the switch to switch back from the first electric position to the second electric position and further causing the first electric contact element to disconnect the contact with the second electric contact element.

20. The apparatus according to claim 19, wherein the handle comprises an opening structured to receive an opening tool for applying the external force with the opening tool to eject the handle.

* * * * *